June 24, 1952 W. BRZOZOWSKI 2,601,258
HELICOPTER WITH JET-OPERATED ROTOR
Filed Nov. 28, 1945 4 Sheets-Sheet 1

INVENTOR
Witold Brzozowski
BY
Emery, Varney, Whittemore & Dix
ATTORNEYS

June 24, 1952 W. BRZOZOWSKI 2,601,258
HELICOPTER WITH JET-OPERATED ROTOR
Filed Nov. 28, 1945 4 Sheets-Sheet 2

INVENTOR
Witold Brzozowski
BY
Emery, Varney, Whittemore & Dix
ATTORNEYS

June 24, 1952 W. BRZOZOWSKI 2,601,258
HELICOPTER WITH JET-OPERATED ROTOR
Filed Nov. 28, 1945 4 Sheets-Sheet 3

INVENTOR
Witold Brzozowski
BY
Emery, Varney, Whittemore & Dix
ATTORNEYS

June 24, 1952 W. BRZOZOWSKI 2,601,258
HELICOPTER WITH JET-OPERATED ROTOR
Filed Nov. 28, 1945 4 Sheets-Sheet 4
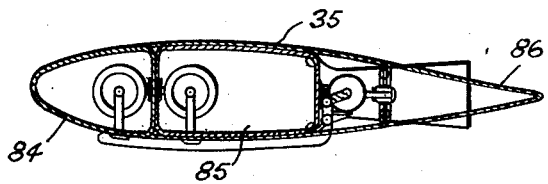
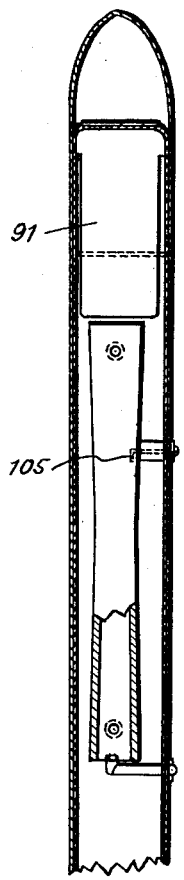
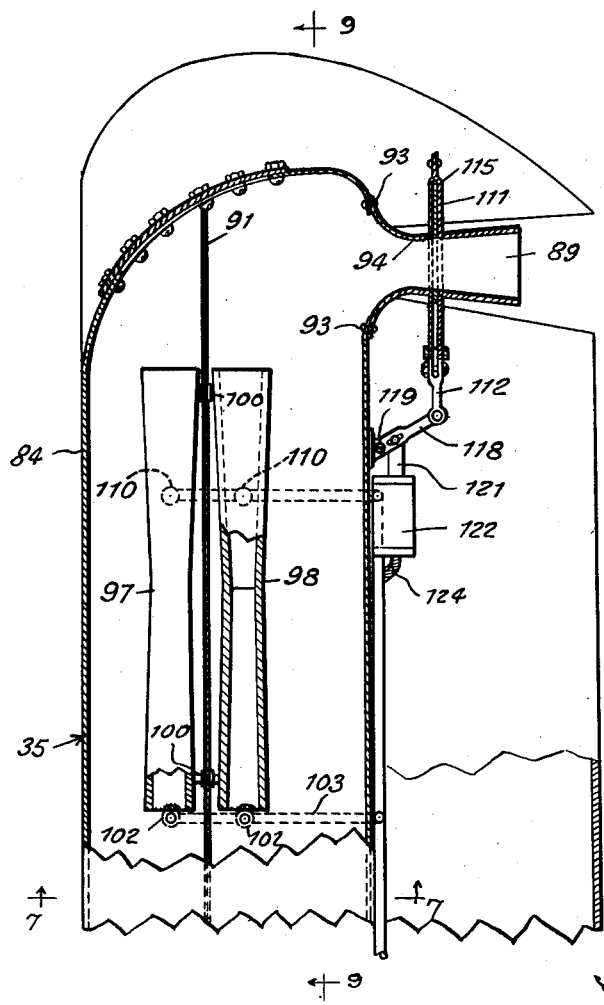
INVENTOR
Witold Brzozowski
BY
Emery, Varney, Whittemore & Dix
ATTORNEYS Patented June 24, 1952

2,601,258

UNITED STATES PATENT OFFICE 2,601,258

HELICOPTER WITH JET-OPERATED ROTOR

Witold Brzozowski, Westmount, Montreal, Canada, assignor to Stefan Czarnecki, Walden, N. Y.

Application November 28, 1945, Serial No. 631,319

7 Claims. (Cl. 170—135.4)

This invention relates to aircraft, and especially to aircraft in which the propeller is rotated by the reaction of jets that issue from the blades of the propeller or from conduits that are secured to the blades. The invention relates more particularly to helicopters and the term "propeller" is used in the description and claims in a broad sense to include helicopter rotors.

Numerous advantages of the helicopter are well recognized, particularly its ability to hover, and to rise and land vertically. Efficiencies of helicopters tend to be low, however, when hovering or in vertical flight because under such conditions there is no translatory movement of the rotor to increase the lift, and tip losses are high when the rotor is operated fast enough to compensate for the loss in lift that results from the lack of translatory movement.

Since it is essential that a helicopter have sufficient power for vertical flight, and since the power has not been used efficiently under such circumstances, helicopters have had larger engines and have been heavier and more costly than would otherwise be necessary.

It is an object of this invention to provide an improved aircraft that has its power system combined with auxiliary means for providing the additional power required for take off, and in the case of a helicopter, for vertical flight. In the preferred embodiment of the invention a helicopter has a jet-propelled rotor, and the additional power for take off and vertical flight is obtained by burning fuel within the conduits through which compressed air flows to the jet openings or nozzles. This auxiliary heating is a less efficient use of the fuel than is obtained from an internal combustion engine driving a compressor, but it provides the added power with little additional weight and cost of equipment, and since it is used only for short periods, the operating efficiency is of less importance than the weight which would be required for the additional engine and compressor capacity that would be needed to get a boost in power equivalent to that obtained from the use of the auxiliary heaters of this invention.

One feature of the invention relates to a burner construction for heating a stream of gas while the gas is traveling at substantial velocity. The invention utilizes a tube placed in such a position that a portion of the air stream travels through the tube. A fuel sprayer at the upstream end of the tube supplies fuel that mixes with the air and burns as it flows along the length of the tube. The tube is highly heated to a temperature above the ignition temperature of the fuel, and the diameter of the tube is correlated with the airstream velocity and rate of flame propagation so that the stream of fuel and air is burned throughout its entire cross section before reaching the end of the tube.

Another object of the invention is to improve the efficiency of helicopters having jet-propelled rotors. This object is attained by providing valves for cutting off the jets from the blades during that portion of each revolution when the blade is retreating. A substantial increase in efficiency is obtained by projecting the reaction jets from the advancing blades only. Other features of the invention relate to improved constructions of the rotor and rotor hub; and to structure for imparting exhaust gas heat to the compressed air stream.

Other objects, features and advantages will appear or be pointed out as the specification proceeds.

In the drawings, forming a part hereof, in which like reference characters indicate corresponding parts in all the views, Figure 1 is a side elevation of a helicopter, partly broken away, illustrating the manner in which compressed air is supplied to the rotor and heated by exhaust gas from the engine.

Figure 7 is a reduced scale sectional view through one of the rotor blades, the section being taken on the line 7—7 of Figure 8.

Figure 8 is a transverse sectional view through the rotor blade shown in Figure 7.

Figure 9 is a sectional view taken on the line 9—9 of Figure 8.

This application is a continuation in part of my application, Serial No. 528,799, filed March 30, 1944, now abandoned; and is a companion of application, Serial No. 116,190, filed August 23, 1949.

Figure 1:
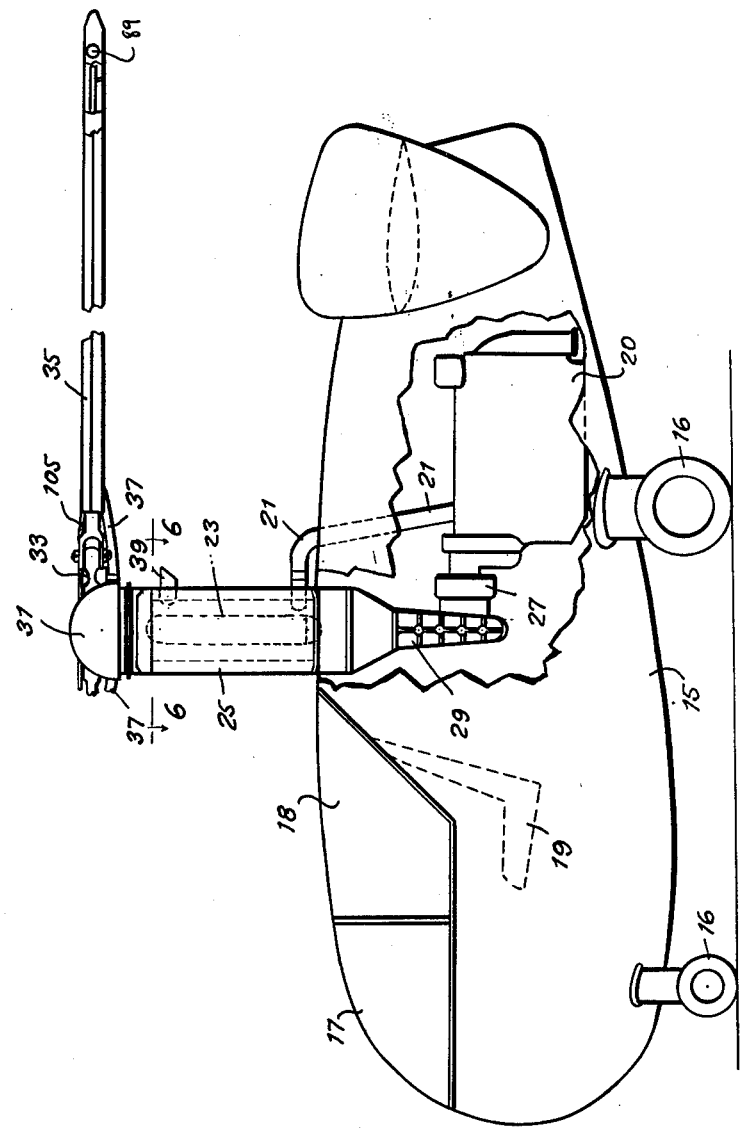

The helicopter shown in Figure 1 includes a fuselage 15 with wheels 16 and a forward passenger compartment closed by a wind shield 17 and cover 18. Seats 19 within the passenger compartment are indicated by dotted lines. In the rearward end of the fuselage there is an internal combustion engine 20 with an exhaust pipe 21 which extends upward to a heat exchanger 23 located in a pylon 25 secured to the upper portion of the fuselage.

The engine 20 drives a compressor 27 that delivers compressed air into a transition section 29 communicating with a lower end of the pylon 25. A rotor hub 31 is attached to the upper end of the pylon 25 and has articulation links 33 angularly spaced around the hub for connection with rotor blades 35.

Compressed air from the housing 29 passes up through the hollow pylon 25, around the exhaust heat exchanger 23, and into the lower portion of the hub 31 in which the compressed air divides and passes through conduits 37 leading to the respective blades of the rotor.

This heat exchanger 23 comprises a metal vessel closed at both ends by caps integrally secured to the walls of the vessel. The exhaust pipe 21 from the engine is connected with an inlet pipe at the lower end of the heat exchanger, and there is a tail pipe 39 at the upper end of the heat exchanger from which the exhaust gas escapes to the atmosphere. This construction permits the exhaust gas from the engine to pass through the heat exchanger 23 and out through the exhaust tail pipe 39 at the rear of the pylon without mixing with any of the compressed air which moves up through the pylon 25. The heat exchanger 23 radiates heat to the interior of the pylon and also transmits heat to the air stream in the pylon by conduction to the air which comes in contact with the outside surface of the heat exchanger 23. More complicated heat exchangers can be used in order to cut down the length of the heat exchanger, but since the pylon 25 has to be of substantial length in order to locate the rotor high enough above the fuselage, advantage can be taken of the full length of the pylon and a simple and lightweight heater used. The apparatus shown is merely representative of heat exchangers.

Figure 2:
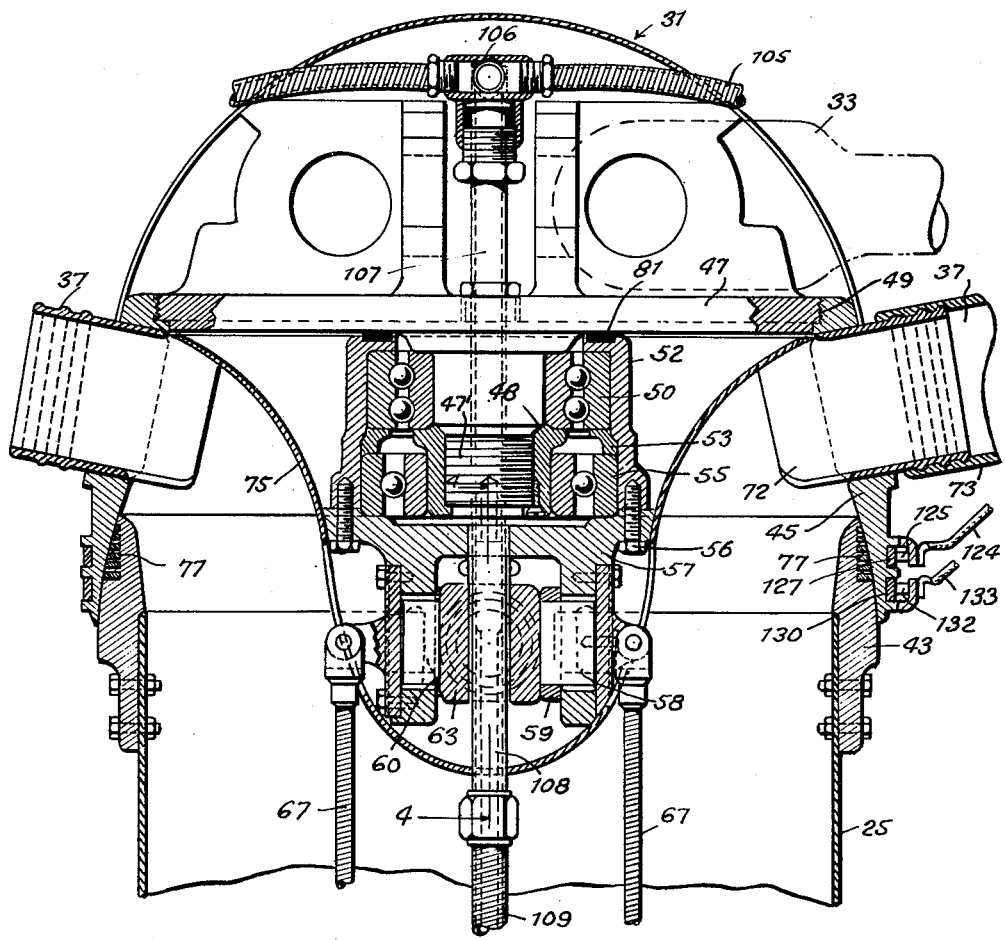
Figure 2 is an enlarged, sectional view of the rotor hub and the connections for supplying fuel and compressed air from the hub to the rotor blades.

The internal construction of the hub 31 is shown in Figure 2. The hub includes a non-rotatable or fixed portion 43 bolted to the upper end of the pylon 25, and a rotatable portion 45. The rotatable portion 45 is held down on the non-rotating member 43 by an attaching element 47 which has a threaded center portion 47¹ extending down and screwed into a nut 48. This attaching member 47 has threads 49 around its peripheral edge screwed into the rotatable hub member 45.

The nut 48 holds the inner race of a combined axial and thrust bearing 50 against a shoulder of the attaching member 47, and a bearing housing 52, which fits over the bearing 50, holds the outer race of the bearing 50 against a spacer 53 which in turn bears against the outer race of an alignment bearing 55. The inner race of this alignment bearing 55 fits over the nut 48.

Figure 4:
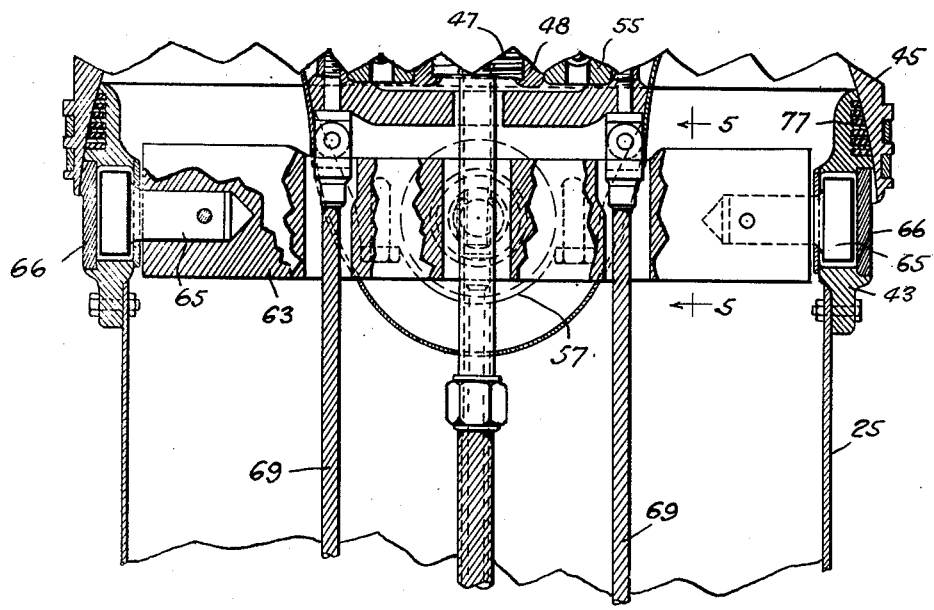
Figure 4 is a sectional view on the line 4—4 of Figure 2.
Figure 5:
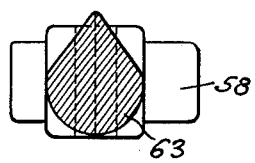
Figure 5 is a sectional view on the line 5—5 of Figure 4.
Figure 6:
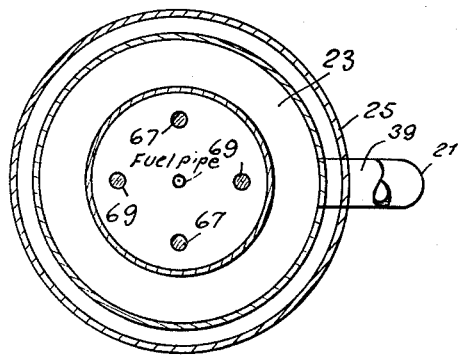
Figure 6 is an enlarged sectional view, on line 6—6 of Figure 1, through the pylon and heat exchanger.

The bearing housing 52 has its lower end connected to a longitudinal control yoke 57 by screws 56. The yoke 57 is mounted on a pin 58 with spacers 59 and 60. This pin extends from both sides of a lateral control axle 63, and the lateral control axle 63 is pivotally attached to the fixed portion 43 of the rotor hub by axle pins 65 (Figure 4) held in place by covers 66. The ends of the axle 63 are streamlined, as shown in Figure 5, so as to reduce the resistance that they offer to the upward passage of compressed air from the pylon. The helicopter is controlled laterally by means of lateral control cables 67 (Figure 2), and longitudinally by means of longitudinal control cables 69 (Figure 4). The mating surface of the rotatable hub portion 45 over the fixed hub portion 43 is substantially spherical about a center at which the axis of the pin 58 intersects the axis of the pins 65, and the rotatable hub portion 45 can be tilted in any direction by means of the control cables 67 and 69. The rotor can, therefore, be tilted forwardly so that the aircraft will be propelled forwardly without the use of an air screw, making the aircraft, properly speaking, a helicopter.

Rotation of the rotor is obtained by the reaction of jets of compressed air or gas expelled from the blades or from some jet orifice or nozzle connected to the blades. For purposes of the description and claims, the term "blade" in a broad sense to include not only the blade structure proper but any nozzles, pipes and other elements attached to the blade and rotatable as a unit with it.

Compressed air that passes up through the pylon 25 enters the conduits 37 which communicate with the interior of the rotor blades. These conduits 37 include a fitting 72 which extends from the rotatable portion 45 of the hub and a flexible tube 73 that leads to a fitting on the rotor blade. There is a generally conical shield 75 within the hub for giving the compressed air chamber of the hub a fair form that reduces turbulence in the stream of air passing off from the pylon 25 and out through the conduits 37 to the rotor blades of the helicopter. Leakage between the fixed portion 43 and rotatable portion 45 of the rotor hub is reduced to a minimum by means of labyrinth glands 77.

Figure 3:
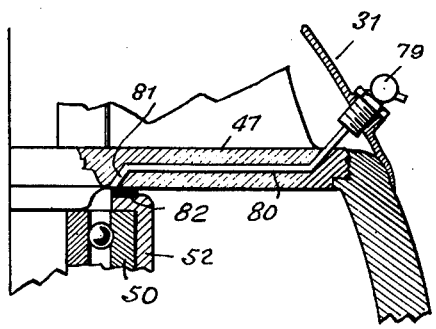
Figure 3 is a detail view showing the way in which lubricant is supplied to the center bearings of Figure 2.

Figure 3 shows the way in which lubricant is supplied to the bearing 50 and other bearings incased beneath the connecting element 47. A lubricant fitting 79 extending from the outside of the hub 31 leads to a passage 80 in the attaching element 47. This passage 80 has an outlet 81 opening into the housing 52 above the bearing 50 so that lubricant forced into the fitting 79 passes through the passage 80 and from the outlet 81 drops down on the bearings within the housing 52. Lubricant is sealed in the housing 52 by a sealing ring, such as a felt washer 82, retained in an annular groove in the top of the housing 53 and bearing against the underside of the attaching element 47.

Figure 7 shows a section through one of the rotor blades 35. These blades are made of sections that include a leading edge section 84, a center section 85 and a trailing edge section 86. Compressed air flows lengthwise in the blade 35 through the sections 84 and 85, both of which serve as conduits for the compressed air. Near the outer edge of the blade 35 there is a jet opening or nozzle 89 through which compressed air from within the rotor blade flows rearwardly to develope the reaction which drives the blade forward. The nozzle 89 opens directly into the center section 85, but compressed air or gas from the leading edge section 84 flows into the center section at the region of the nozzle 89 through an opening 91.

In the construction shown in Figure 8, the nozzle 89 is a separate element connected to the center section of the rotor blade by fastenings such as rivets 93, and this nozzle 89 has a restricted throat section 94 and an expanding outlet for discharging the gas or air at high velocity. The jet orifice or nozzle can be made as an integral part of the center section of the rotor blade, and the blade can be made without the different sections shown, and shaped to provide a suitable outlet for the gas. The term "nozzle" is used in a broad sense, therefore, to indicate any jet opening from which the compressed gas can be discharged under conditions of substantial velocity and without excessive turbulence which would destroy the efficiency of the jet reaction.

In order to obtain extra thrust for conditions such as exist during take off, and for developing the extra power needed for hovering and for vertical flight, auxiliary heaters are provided in the blade conduits through which the compressed air passes to the nozzle 89. Figures 7 and 8 show burners or combustion chambers comprising elongated sleeves or tubes 97 and 98 in the sections 84 and 85 respectively. Each of these tubes is connected with a wall of the conduit by supporting means 100 which hold the tubes 97 and 98 with their axes extending in the general direction of the flow of the gas stream and in such position that a portion of the gas stream in each of the sections 84 and 85 passes through the tube 97 or 98 enclosed in that section. These tubes 97 and 98 are in effect by-pass conduits through which a portion of the air travels to the end of the blade. The supporting means 100 contact only a small part of the tubes 97 and 98 and hold these tubes out of contact with the remainder of the blade structure so that the tubes are substantially insulated from the blade structure and can operate at high temperatures.

Toward the upstream end of each of the tubes 97 and 98 there is a nozzle or fuel sprayer 102. Both of the fuel sprayers are supplied with fuel from a supply pipe 103 that passes down the inside of the blade and communicates with a flexible fuel supply tube 105 (Figure 2) leading to a fuel header 106 in the rotor hub. This header 106 is at the upper end of a vertical feed pipe 107 that rotates as a unit with the rotor but extends down into a lower feed pipe 108 attached to the non-rotatable portions of the rotor hub. This connection provides a rotatable joint in the fuel line. A flexible tube 109 at the lower end of the pipe 108 permits the pipe 108 to move as a unit with the tiltable elements of the rotor. This fuel pipe 108 connects with a fuel supply source, not shown, from which fuel is supplied to the tube 109, pipe 108, and header 106 under some pressure.

The tubes 97 and 98 are made of material, either ceramic or metal, that can be heated above the ignition temperature of the fuel with which the burners are intended to be used. Each of the burners is provided with an electrical ignition device such as a spark plug 110 located down stream from the fuel sprayers 102. When the burners are used, fuel is supplied to the sprayers 102 and the atomized or vaporized fuel from the sprayers travels down the tubes with the current of air that enters the open end of the tubes around the sprayers 102. This mixture of fuel and air is ignited by the spark plugs 110 and burns within the tubes 97 and 98 causing the tubes to become heated to a temperature above the ignition temperature of the fuel. Because of the high velocity of the air stream through the rotor blade and through the tubes 97 and 98, the flames would be blown away from the sprayers 102 and satisfactory combustion of the fuel would not be obtained were it not for the high temperature of the tubes 97 and 98 after the burners are in full operation. The diameter of the opening through each of the burners 97 and 98 is so correlated with the velocity of the air stream and the rate of flame propagation through the air-fuel mixture that flame ignited from the hot walls of the tube, if not otherwise, will traverse the entire cross section of the air-fuel stream and thoroughly burn the fuel before it passes from the tubes 97 and 98 and mixes with the other air on its way to the nozzle 89.

Higher efficiency can be obtained by projecting the reaction jets from the nozzle 89 only during the time that the rotor blade of that nozzle is advancing. In order to take advantage of this fact, the nozzle 89 is then equipped with a slide valve 111 having a yoke 112 by which the slide valve can be drawn across the nozzle 89 to shut off the flow of compressed gas from the nozzle when the rotor blade is retreating. The slide valve 111 moves in a guide 115 secured to the nozzle 89.

The operating mechanism for the slide valve 111 includes a lever 118 connected to the rotor by a pivot 119, and moved periodically by a plunger 121 that slides in a solenoid 122. Power to energize the solenoid 122 is supplied by a conductor 124. This conductor extends down the blade 35 to a brush 125 (Figure 2) that rides on a commutator 127, and the conducting and insulating sections of the commutator 127 are so correlated in their angular extent that power is supplied to operate the solenoid and close the valve to shut off the jet whenever the blade changes from an advancing to a retreating phase of its movement. The conducting segments of the commutator are insulated from the hub 31. A conductor ring 130, mounted on and insulated from the hub 31, is located just below the commutator 127 and supplies power through a brush 132 and conductor 133 to the spark plugs or other igniters for the burners in the rotor blades. There are separate brushes 125 and 132, and separate conductors 124 and 133 for each of the rotor blades.

The preferred embodiment of the invention has been described but changes and modifications can be made and some features of the invention can be used without others.

I claim as my invention:

1. A helicopter including a rotor having blades, bearings on which the rotor turns, a nozzle on each blade from which a jet of gas is projected rearwardly to turn the rotor on said bearings, chambers within the blades communicating with the upstream ends of said nozzles, apparatus that supplies compressed gas to the chambers, a shut off valve upstream from the discharge end of each nozzle and movable into a position to block the flow of compressed gas through that nozzle, and automatic valve-operating mechanism including elements responsive to the turning of the rotor on said bearings, said valve-operating mechanism being correlated with the positions of the bearings so as to shut off the jets from the respective blades during the time that the blades are retreating.

2. A helicopter comprising a jet-operated rotor having a plurality of blades, bearings on which the rotor turns, nozzles located at the end portions of the respective blades and from which jets of gas are directed from the trailing edges of the blades, to turn the rotor on said bearings, chambers within the blades communicating with the upstream ends of said nozzles, apparatus that supplies compressed gas to the chambers, and automatic valve means upstream from the discharge end of each nozzle and movable into a position to block the flow of compressed gas through that nozzle, said automatic valve-operating means being correlated with the positions of the bearings so as to close the valve means and prevent discharge of gas from each nozzle except when the blade of that nozzle is advancing.

3. A helicopter rotor including a hub connected with a pylon, blades extending from the hub, a nozzle at the outer end of each blade, a passage in each blade communicating with the nozzle and with a common gas supply chamber within the hub, and through which compressed gas from the hub flows to the nozzle to produce a reaction jet that drives the rotor, a valve upstream from the discharge end of each nozzle and movable into a position to shut off the flow of gas through that nozzle, and mechanism for operating the valve in accordance with the angular position of the blade around the pylon to which the rotor is connected.

4. A helicopter including a pylon, a fixed hub portion secured to the upper end of the pylon and having a convex spherical bearing surface, an upper hub portion that rotates about an axis and that has a concave spherical bearing surface rotatable as a unit with the rotor about said axis and that fits the convex bearing surface, a labyrinth gland construction on one of the bearing surfaces and in position to cooperate with the other bearing surface to seal against gas leakage between the convex and concave bearing surfaces making the joint provided by said bearing surfaces substantially gas tight, an axle extending across the fixed hub portion and pivotally held by bearings in said fixed hub portion, central bearing means connecting the rotatable hub portion with the axle, conduits leading from the interior of the rotatable hub portion for passage of compressed gas from the interior of the hub to rotor blades connected to said rotatable hub portion, and a shield within the hub under said central bearing means, said shield being shaped to give the space below it a fair form for the flow of gas from the pylon upward into the hub and out through the conduits leading to the blades.

5. A helicopter including a pylon, a fixed hub portion secured to the upper end of the pylon and having a convex spherical bearing surface, an upper hub portion that rotates about an axis and that has a concave spherical bearing surface rotatable as a unit with the rotor about said axis and that fits the convex bearing surface, a seal making the joint provided by said bearing surfaces substantially gas tight, an axle extending across the fixed hub portion and pivotally held by bearings in said fixed hub portion and about which the rotatable hub rocks on an axis through the center of the convex and concave bearing surfaces, central bearing means connecting the rotatable hub portion with the axle, a plurality of hollow rotor blades extending outward from the rotatable hub portion and having conduits lengthwise of the blades for the passage of gas to jet outlets near the outer ends of the blades, other conduits leading from the interior of the rotatable hub portion to the inner ends of said conduits in the blades, a shield within the hub under said axle and central bearing means, said shield being shaped to give the space below it a fair form for the flow of gas from the pylon upward into the hub and out through said other conduits, means for providing additional thrust to the rotor blades to maintain their lift when the helicopter is hovering or its speed of translation is low, said means comprising heaters in the blades for heating gas flowing lengthwise through the blades, and passages for supplying fuel to the heaters including a fuel pipe extending upward through the central bearing means that connect the rotatable hub portion with the axle.

6. In a jet-operated helicopter of the class wherein a rotor has a plurality of hollow blades through which a stream of air is supplied to a jet discharge outlet near the tip of each blade and an engine-driven compressor in the helicopter delivers a volume of air to the blades and through the blades at a super-atmospheric pressure sufficient alone to provide power to fly the helicopter in horizontal flight, the combination with said rotor of air passages through the hollow blades comprising the major part of the cross section of the blades and leading from a supply chamber at a hub of the rotor to the discharge outlets near the blade tips, at least one combustion chamber in each blade and extending in the direction of the blade length and open at both ends for the flow of the air stream at high velocity along the length of the blade and through the combustion chamber when there is no combustion in the chamber, the inside surface of the combustion chamber being of heat resistant material and being at a substantial distance from the inside surface of the walls of the blades substantially all around the combustion chamber to provide heat insulation space between the surfaces, a tip structure connected to each blade and having surfaces in position to deflect through the discharge outlet the air stream that flows lengthwise through the blade and combustion chamber, a fuel supply nozzle in the combustion chamber and near the upstream end of said chamber, an ignition device in the chamber downstream from the nozzle, and a fuel supply device that supplies fuel to the nozzles in the combustion chambers in sufficient quantity to develop auxiliary power for vertical ascent and hovering of the helicopter.

7. In a jet-operated helicopter of the class wherein a rotor has a plurality of hollow blades through which a stream of air is supplied to a jet discharge outlet near the tip of each blade and an engine-driven compressor in the helicopter delivers a volume of air to the blades and through the blades at a super-atmospheric pressure sufficient alone to provide power to fly the helicopter in horizontal flight, each of said blades including one or more passages having a total cross section that comprises the major part of the total cross section of the blade, said one or more passages extending all the way from a supply chamber at the rotor hub to the jet discharge outlet at the blade tip, the combination with said rotor of combustion chambers in the blades, said combustion chambers including one or more elongated sleeves located in said passages supported from the blade and spaced from the inside surface of the hollow blade throughout the full length of the sleeve so that there is space for the passage of part of the air stream between the outside surface of the sleeve and the inside surface of the hollow blade to prevent excessive transfer of heat from the sleeve to the blade, said sleeve extending in the direction of the length of the blade and being open at both ends for the flow of the air stream at high velocity along the length of the blade and through the sleeve regardless of whether there is combustion in the sleeve, a tip structure at the end of each blade and having surfaces in position to deflect, through the discharge outlet, the air stream that flows lengthwise through the blade and sleeve, a fuel supply nozzle near the upstream end of the sleeve, an ignition device in the sleeve downstream from the nozzle, and a fuel supply device that supplies fuel to the nozzle in sufficient quantity to develop auxiliary power for vertical ascent and hovering of the helicopter.

WITOLD BRZOZOWSKI.

REFERENCES CITED

The following references are of record in the file of this patent:

UNITED STATES PATENTS

| Number | Name | Date |
|---|---|---|
| 1,099,083 | Duc | June 2, 1914 |
| 1,569,607 | Beck | Jan. 12, 1926 |
| 1,932,702 | Langdon | Oct. 31, 1933 |
| 2,092,077 | Knight | Sept. 7, 1937 |
| 2,142,601 | Bleecker | Jan. 3, 1939 |
| 2,330,056 | Howard | Sept. 21, 1943 |
| 2,370,181 | Miller | Feb. 27, 1945 |
| 2,371,687 | Gerhardt | Mar. 20, 1945 |
| 2,397,357 | Kundig | Mar. 26, 1946 |
| 2,429,646 | Pullin | Oct. 28, 1947 |
| 2,457,936 | Stalker | Jan. 4, 1949 |

FOREIGN PATENTS

| Number | Country | Date |
|---|---|---|
| 227,151 | Great Britain | Jan. 12, 1925 |
| 275,677 | Great Britain | Mar. 22, 1928 |
| 293,594 | Great Britain | June 15, 1927 |
| 366,450 | Great Britain | July 30, 1930 |
| 556,866 | Great Britain | Oct. 26, 1943 |
| 648,107 | France | Aug. 7, 1928 |
| 859,640 | France | June 10, 1940 |